March 12, 1935.  C. E. HILLERY-COLLINGS  1,993,884
PHOTOGRAPHIC CAMERA CONVERTIBLE TO PROJECTOR
Filed June 9, 1933
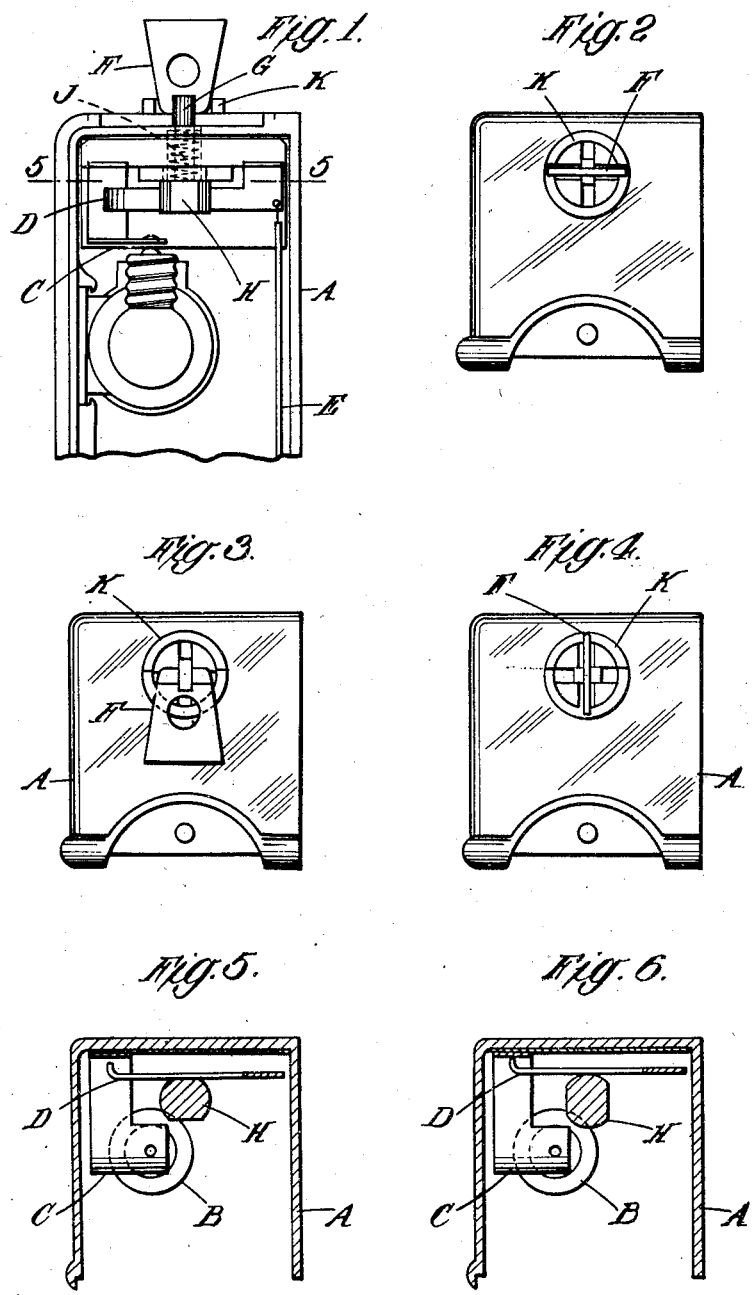
CHARLES EDWARD HILLERY-COLLINGS
INVENTOR
BY Haseltine, Lake & Co.
ATTORNEYS Patented Mar. 12, 1935

1,993,884

UNITED STATES PATENT OFFICE 1,993,884

PHOTOGRAPHIC CAMERA CONVERTIBLE TO PROJECTOR

Charles Edward Hillery-Collings, London, England, assignor to Camera-Projectors Limited, London, England, a British company Application June 9, 1933, Serial No. 674,972
In Great Britain July 18, 1932

4 Claims. (Cl. 88—16)

This invention relates to photographic cameras and projectors, that is, to instruments which can be used convertibly both as cameras and projectors, especially for cinematographic purposes, and which instruments are provided with an electric lamp for use in projection. Its chief objects are to ensure that the current to the lamp is cut off when the instrument is used as a camera, thus preventing the accidental fogging of the film which might arise from the light being left on, and also to ensure that the current is cut off when the instrument is stowed in a case.

According to the invention a view finder is directly or indirectly associated with the lamp switch in such manner that the circuit through the lamp is opened when the view finder is either in its operative position for use or laid down against the body of the instrument for packing, the circuit being closed by moving the view finder into another position.

In order that the said invention may be clearly understood and readily carried into effect, the same will now be described more fully with reference to the accompanying drawing illustrating an exemplification of the invention, wherein Figure 1 represents in elevation such parts of the instrument as are necessary to the explanation of this invention.

Figure 2 is a plan of the top of the back portion of the instrument with the view finder erected as in Figure 1.

Figure 3 is a similar plan with the view finder laid down for storage.

Figure 4 is a similar plan with the view finder turned at right angles to its normal position in order to enable the instrument to be used for the purpose of projecting.

Figure 5 is a horizontal section taken on the line 5—5 in Figure 1 with the switch open.

Figure 6 is a similar horizontal section with the switch closed, corresponding with the position of the view finder shown in Figure 4.

A indicates the casing of the instrument, B the lamp, C a switch member in contact with the lamp, D a switch member connected by a conductor E with the battery or other source of electrical energy, F the view finder hinged on a rotatable shank G, at the lower end of which shank is a foot or enlargement H of insulating material having two flattened sides. A confined spring J surrounding the shank G prevents undesired loose movement of the view finder. A semi-circular wall K is provided on the top of the instrument at the back of the view finder, in order to prevent the view finder from being laid down in other than a forward position. Therefore if the view finder has been turned to close the circuit through the lamp, it must be restored to the operative position, wherein the circuit is opened, before it can be folded down to enable the instrument to be replaced in its case or box. The wall K may extend over more than a semi-circle, and be formed with a gate at its front side to allow the view finder to be laid down.

When the view finder is erected for use in taking a photograph (see Figures 1 and 2) or laid down for storage (Figure 3) the foot H has one of its flat sides against the switch member D, and as shown in Figure 5, the circuit through the lamp is open. When however the view finder is turned through an arc of 90 degrees into the position shown in Figure 4, in which position it cannot be used as a view finder, the foot H presses the switch member D into contact with the switch member C, and the circuit through the lamp is thereby completed.

Manifestly, variations may be resorted to within the scope of my invention, and parts may be used without others.

What I claim and desire to secure by Letters Patent of the United States is:—

1. Photographic apparatus convertible for use as a projector, comprising a camera provided with a lamp for projection purposes, a closable switch controlling the circuit of said lamp and tending to assume a position in which the circuit is opened, and a view finder, rotatable upon said camera into operative and inoperative positions disposed approximately at right angles to each other, which is provided with a shank rotatable therewith and having in turn a member rotatable with said shank so as to engage said switch in at least one inoperative position of said view finder in order to hold said switch closed, while allowing said switch to open in the operative position of said view finder.

2. Photographic apparatus convertible for use as a projector, comprising a camera provided with a lamp for projection purposes, a closable switch controlling the circuit of said lamp and tending to assume a position in which the circuit is opened, and a view finder rotatable upon said camera into operative and inoperative positions disposed approximately at right angles to each other and capable of being collapsed from the operative position to lie in an inoperative position against the body of the camera for packing, which view finder is provided with a shank rotatable therewith and having in turn a member rotatable with said shank so as to engage said switch in at least one inoperative position of said view finder in order to hold said switch closed, while allowing said switch to open in the collapsed position of said view finder.

3. Photographic apparatus convertible for use as a projector, comprising a camera provided with a lamp for projection purposes, a closable switch controlling the circuit of said lamp and tending to assume a position in which the circuit is opened, a view finder rotatable upon said camera into operative and inoperative positions disposed approximately at right angles to each other, which view finder is provided with a shank rotatable therewith and having in turn a member rotatable with said shank so as to engage said switch in order to hold said switch closed in either of two opposite rotated positions of the shank which are spaced a quarter turn on both sides of an intermediate operative position of the view finder, which member in said intermediate operative position and also in a relatively opposite collapsed position of said view finder has a shape allowing said switch to open.

4. Photographic apparatus according to claim 1, wherein the view finder is hinged on the rotatable shank, and means are provided for preventing movement of the view finder into collapsed position from a position wherein the member on the shank retains the switch in closed condition.

CHARLES EDWARD HILLERY-COLLINGS.